United States Patent [19]
Elsner et al.

[11] Patent Number: 6,134,787
[45] Date of Patent: Oct. 24, 2000

[54] METHOD OF PRODUCING A RAIL-BOUND RAIL VEHICLE FOR PASSENGER TRANSPORT

[75] Inventors: Helmut Elsner; Ferdinand Tegeler, both of Berlin; Hans-Dieter Eisbrecher, Vellmar, all of Germany

[73] Assignee: DaimlerChrysler AG, Stuttgart, Germany

[21] Appl. No.: 09/317,759

[22] Filed: May 24, 1999

Related U.S. Application Data

[62] Division of application No. 08/779,942, Dec. 23, 1996, Pat. No. 5,918,548.

[30] Foreign Application Priority Data

Dec. 23, 1995 [DE] Germany ............................ 195 48 725

[51] Int. Cl.$^7$ .................................................. B21D 53/88
[52] U.S. Cl. ......................... 29/897.2; 29/460; 105/397; 105/399; 156/158; 156/304.2
[58] Field of Search .................... 29/897.2, 460, 29/458; 156/304.2, 304.3, 304.5, 158, 293, 157; 105/396, 397, 399, 401, 404, 407, 409; 296/187, 191, 197, 203, 205

[56] References Cited

U.S. PATENT DOCUMENTS

| | | | |
|---|---|---|---|
| 2,216,025 | 9/1940 | Sheppard | 105/399 |
| 2,226,083 | 12/1940 | Thunstrom et al. | 105/399 |
| 4,337,708 | 7/1982 | Peterson | 105/397 |
| 5,042,395 | 8/1991 | Wackerle et al. | 105/397 |
| 5,140,913 | 8/1992 | Takeichi et al. | 105/397 |
| 5,433,151 | 7/1995 | Ohara et al. | 105/397 |
| 5,601,034 | 2/1997 | Tao et al. | 105/397 |
| 5,670,109 | 9/1997 | DeRees | 156/304.5 |
| 5,849,122 | 12/1998 | Kenmochi et al. | 156/293 |

*Primary Examiner*—Irene Cuda
*Assistant Examiner*—Trinh Nguyen
*Attorney, Agent, or Firm*—Herbert L. Lerner; Laurence A. Greenberg; Werner H. Stemer

[57] ABSTRACT

A method of producing a rail-bound rail vehicle for passenger transport, includes providing at least one trough-like superstructure with a floor and adjoining side walls formed in a framework construction from side-wall posts, lower longitudinal members and upper longitudinal flanges or chords. The upper longitudinal flanges are supported against one another by connecting members. The side walls have windows and access areas with doors. The side-wall posts are disposed in a zigzag manner and are rigidly connected to the lower longitudinal members and the upper longitudinal flanges, and serve as supporting elements for the windows and side paneling elements fastened thereto. The superstructure is assembled from shaped pieces and bar parts which have been cut to length. The bar parts fitted together with the shaped pieces are aligned, connecting surfaces between the bar parts and the shaped pieces are provided with a bonding agent, the bar parts and shaped pieces to be connected are subsequently bonded, the bonding agent is set, and attachment of exterior paneling and windows is then carried out by a thick-film bonding technique.

1 Claim, 1 Drawing Sheet

METHOD OF PRODUCING A RAIL-BOUND RAIL VEHICLE FOR PASSENGER TRANSPORT

CROSS-REFERENCE TO RELATED APPLICATION

This application is a division of application Ser. No. 08/779,942, filed Dec. 23, 1996 now U.S. Pat. No. 5,918, 548.

BACKGROUND OF THE INVENTION

Field of the Invention

The invention relates to a method of producing a rail vehicle for passenger transport, having at least one superstructure or body of trough-like construction with a superstructure or body floor and with adjoining side walls formed in a framework construction from inclined side-wall posts, lower longitudinal members and upper longitudinal flanges or chords, the upper longitudinal flanges are supported against one another through the use of connecting members, the side walls have windows and access regions with doors, and the side-wall posts are disposed in a zigzag manner and are rigidly connected to the lower longitudinal members and the upper longitudinal flanges and serve as supporting elements for the windows and side paneling elements fastened thereto. The invention also relates to a rail vehicle produced according to the method.

In this context, rail vehicles are understood to be all track-bound land vehicles for passenger transport, specifically both tractive units used for that purpose and cars which are not driven, but are connected to the tractive units. Such mass transport rail vehicles serving for passenger transport are generally known and are used primarily for local traffic, for example as rapid urban or subway trains. In accordance with the high mechanical loads occurring in such cases, the known engines and cars that are provided are correspondingly laid out and constructed in terms of strength. However, that has a disadvantageous effect on their weight and, as a result, on their fuel consumption. A rail vehicle made in a lighter construction, that is to say a weight-saving construction of the rail vehicle, should therefore be the objective.

Such a rail vehicle with a low dead weight is known from German Utility Model DE 94 15 771 U1. That rail vehicle is constructed in accordance with the type mentioned at the outset, that is to say it has a superstructure or body made in a framework construction with inclined side-wall posts which are preferably loaded only in tension and compression, but not in shear or by bending moments. Those side-wall posts form a zigzag-like framework with upper and lower longitudinal members, which is provided with an exterior paneling that is non-load-bearing, that is to say not involved in the conduction or transmission of force. The respective connection points of the longitudinal members to the side-wall posts are constructed as welded junctions.

The production of welded joints is time-consuming as a result of the seam preparation required in each case and the aligning work in order to remove the distortion caused by the welding heat. Furthermore, under certain circumstances, that is to say depending on the materials being used, for example in the case of high-strength steels, temperature control which is to be observed precisely and possibly heat treatment may be necessary. Moreover, structures which can adapt to tolerances are required for the interior fittings of the superstructure or body.

Although screw and/or rivet connections which are seen as a possible alternative do not give rise to any aligning work due to thermal distortion, the production outlay in such cases is comparable to that of welded constructions. Furthermore, they entail a higher weight in comparison with welded constructions, which means that such a construction variant also fails in terms of weight-reducing solutions.

SUMMARY OF THE INVENTION

It is accordingly an object of the invention to provide a rail vehicle and a method of producing the rail vehicle, which overcome the hereinafore-mentioned disadvantages of the heretofore-known devices and methods of this general type, in which the construction of the vehicle is optimized in terms of saving weight, without it resulting in disadvantages for the rail vehicle due to mechanical loads which are attributed to external effects. The method is intended to avoid the disadvantages mentioned above while maintaining the framework construction of the rail vehicle and to make its production possible with less time requirement.

With the foregoing and other objects in view there is provided, in accordance with the invention, a method of producing a rail-bound rail vehicle for passenger transport, which comprises assembling at least one trough-like superstructure with a floor and with adjoining side walls formed in a framework construction from side-wall posts, lower longitudinal members and upper longitudinal flanges; supporting the upper longitudinal flanges against one another with connecting members; placing windows and access regions with doors in the side walls; placing the side-wall posts in a zigzag manner and rigidly connecting the side-wall posts to the lower longitudinal members and the upper longitudinal flanges to serve as supporting elements for the windows and side paneling elements fastened thereto; and assembling the superstructure from shaped pieces and cut-to-length bar parts, by aligning the bar parts fitting together with the shaped pieces, applying a bonding agent to connecting surfaces between the bar parts and the shaped pieces and subsequently bonding the bar parts and the shaped pieces to be connected by setting the bonding agent, and then attaching exterior paneling and windows by a thick-film bonding technique.

According to the invention, the superstructure or body is composed of bar parts which have been cut to length and shaped pieces. In this case, the fitted-together shaped pieces and the bar parts are aligned and the connecting surfaces between the bar parts and the shaped pieces are subsequently provided with an adhesive. The bonding of the bar parts and shaped pieces to be connected takes place by the adhesive setting between their contact surfaces. Depending on the bonding agent being used, the hardening of the adhesive usually takes place at ambient temperature.

The attachment of the exterior paneling and windows is then carried out through the use of a thick-film bonding technique. This thick-film bonding serves to suppress the propagation of noise by isolating the structure-borne sound originating from the load-bearing structure of the superstructure or body. Of course, the contact surfaces provided for bonding are prepared for bonding, that is to say cleaned and degreased mechanically and/or chemically, prior to the application of the bonding agent, that is to say prior to assembly. This guarantees that bonding defects can virtually be ruled out.

According to the invention, a so-called dry assembly of the longitudinal flanges or chords and side-wall posts, referred to below as bar parts, and the shaped pieces to be connected thereto is thus provided, with these elements essentially forming the superstructure or body. It is only when the bar parts and shaped pieces have been fitted into one another and aligned that the bonding agent is introduced, which secures the connection with material bonding and subsequently sets automatically, for example overnight, without any further measures being required.

In accordance with the production according to the invention, the respective bonding is provided in such a way that the limit of the achievable strength of such connections is intentionally not utilized, but the connection bonding achieves an optimum level of durability and operational reliability as well as safety during processing. For this purpose, as already mentioned, the shaped pieces each have joining regions for connection to the bar parts, the length of which joining regions is adapted to the forces to be transmitted, thus guaranteeing sufficient reserves for particular load cases without the strength limit being reached.

Furthermore, in accordance with an advantageous development of the invention, to increase the production reliability, provision is made for the bar parts and the shaped pieces to be made of material of the same type, which furthermore opens up the possibility of connecting the bar parts to one another through the use of cold pressure-welding for the purpose of increasing the connection reliability.

With the objects of the invention in view there is also provided a rail vehicle for passenger transport, comprising at least one trough-like superstructure having a floor and adjoining side walls formed in a framework construction from side-wall posts, lower longitudinal members and upper longitudinal flanges, the upper longitudinal flanges supported against one another by connecting members, and the side walls having windows and access regions with doors; and the superstructure having bar parts and shaped pieces connected to one another, the shaped pieces having junctions with the bar parts, the bar parts fitted together with the shaped pieces defining common contact surfaces, the common contact surfaces each bounding a gap with one another, and a bonding agent filling the gap and connecting the bar parts and the shaped pieces to one another by material bonding.

In accordance with another feature of the invention, the superstructure or body is formed from profiles and shaped pieces which are connected to one another, in which case the shaped pieces are constructed as junctions, the profiles can be fitted together with the shaped pieces and in the process have common contact surfaces, and the common contact surfaces each bound a gap with one another, which is filled with a bonding agent that connects the profiles and shaped pieces to one another with material bonding.

Appropriately disposed so-called application ducts which are advantageously provided for introducing the bonding agent into the respective gap, allow easy penetration of the bonding agent into the gap between the bar parts on one side and the shaped pieces on the other side. The gap surfaces, that is to say the mutual contact surfaces of the shaped pieces and the bar parts, in this case are dimensioned to be sufficiently large with respect to the loads acting on them.

In accordance with a further feature of the invention, the shaped pieces are provided as cast elements which, depending on the number required, may be produced as pressure die-castings, gravity die-castings or as sand castings from a metal alloy, for example a steel casting or light metal casting. However, the shaped pieces are preferably produced as sand castings. This production possibility allows the invention to be used economically, even in small series.

In accordance with an added feature of the invention, instead of castings, the shaped pieces are formed from forgings which are preferably likewise produced from a metal alloy in the die.

It may be advantageous, in view of efficient production, to provide in principle only a single profile dimension, so that only the respective length of the bars to be connected to the shaped pieces has to be set.

This structural solution variant has the great advantage of ensuring that the respective profile always only has to be cut to length before it is connected to the associated shaped piece. This can advantageously be carried out in an appropriately prepared tool using a simple clamp since no different cross-sections need to be processed.

In accordance with an additional feature of the invention, the shaped pieces are constructed as cast elements or as forged bodies of very complex construction so that all of the joining points, for example in the construction of the door frames, can be integrated into the shaped piece. This leads on one hand to a reduction in the number of individual parts that are required, and on the other hand to a simpler and thus faster assembly of the door, with the production safety likewise being improved in addition.

In accordance with yet another feature of the invention, the bar parts are constructed as profiles, preferably as hollow profiles of rectangular or circular cross-section. In this case, the bar parts can engage in corresponding nozzle-like cutouts in the shaped pieces. However, provision is advantageously made for the bar parts constructed as hollow profiles to be pushed onto guide journals or guide mandrels molded onto the shaped pieces and to be bonded thereto.

In accordance with yet a further feature of the invention, the longitudinal members are each formed from a profile which is open at the top, extends longitudinally, is connected to the lower shaped pieces and into which the shaped pieces are bonded. This is done in order to improve the load-bearing capacity of the longitudinal members with respect to the loads that occur.

In accordance with yet an added feature of the invention, as an alternative refinement, the longitudinal members are formed of individual profiles which extend longitudinally and are likewise connected to the lower shaped pieces, with tensile forces of the longitudinal member being transmitted as shearing forces in the respective bond.

In accordance with yet an additional feature of the invention, a combination of the two solution variants described above is provided.

Two-component polyurethane adhesives are preferably provided for the bonds used in the method according to the invention and in the rail vehicle according to the invention. Instead, two-component epoxy resin adhesives or even so-called no-mix acrylate resins with a chemical activator may also be provided.

In order to obtain sufficient processing and operational reliability of a bonded connection according to the invention, it is expedient, as already mentioned above, to condition the structure of the respective bonding surfaces by appropriate pretreatment, such as blasting, pickling, pyrolytic pretreatment or applying so-called adhesion promoters (primers). This pretreatment ensures a defined and adhesion-friendly bonding surface and thus a reliable bond.

The framework which is essential for the construction of the rail vehicle according to the invention is formed from side-wall posts inclined at an angle of about 30° to a maximum of 70° and does not require the vertical members which are otherwise usually provided. With this construction, it is possible for the members and side-wall posts to be kept free from bending moments and only to be loaded with tensile and compression forces.

In accordance with again another feature of the invention, the side-wall posts are inclined relative to one another at an angle of 60°±10° at their ends, and their ends at the longitudinal member or the longitudinal flange or chord are disposed close together or even in an overlapping manner.

This zigzag-like framework construction of the side-wall posts is only interrupted in the access regions by vertically disposed door posts. The door posts are preferably produced from reinforced profiles in order to thus be able to withstand any application of transverse force. In this case, the door posts, each of which surround an access opening that can be closed by doors, are likewise rigidly connected to the lower longitudinal members and the upper longitudinal flanges.

In accordance with again a further feature of the invention, the rail vehicle according to the invention is constructed in a low-floor construction, with the superstructure or body having a low-lying low floor region which is disposed between the two frame ends adjoining at the end surfaces and in which the access regions are also disposed, and having frame ends adjoining at each end having a floor level which is raised relative to the low floor region. The low floor region includes at least 60% of the useful area of the superstructure or body.

In accordance with again an added feature of the invention, the windows and side-wall elements fastened to the side-wall posts are bonded thereto on their exterior, with additional railing flanges being provided which serve as horizontal rest surfaces both for the windows and for the side-wall elements. The railing flanges are not involved in the transmission of force and can therefore be fastened to the side-wall posts and door posts in a relatively simple manner through the use of a clamping and/or screw connection.

The reduction in weight achieved by the framework construction can amount to up to 25% as compared to the solid-wall construction which is currently generally customary. It is possible, due to the use of sandwich components for the side-wall elements, to additionally achieve a thermal insulation which is improved by 50% as compared to the current status. It can clearly be seen from the above that the energy requirement can be reduced considerably by the structure of a rail vehicle according to the invention. Furthermore, the running costs for the operation of such a rail vehicle are also lower than for comparable known vehicles. Moreover, sound damping which is improved by at least 10% is also possible with the structure provided according to the invention.

In accordance with again an additional feature of the invention, relating to the exterior side walls, sandwich panels which are provided for this purpose have a covering layer formed from fabric-reinforced synthetic resin, for example GC-GFK2, and a plastic core, preferably made of rigid PVC foam. In this case, the plastic core has a thickness of about 15 mm, while the entire sandwich panel does not exceed a total thickness of 20 mm. Additionally, a metal sheet, preferably made of light metal, may be disposed on the exterior of the rail vehicle according to the invention, that is to say on the sandwich panel.

In accordance with a concomitant feature of the invention, an alternative structure of the sandwich panels provided for use in the rail vehicle has a plastic core disposed between two wooden boards, in which case a metal sheet, for example made of light metal, may likewise be disposed on its exterior and a plastic board on the interior.

Other features which are considered as characteristic for the invention are set forth in the appended claims.

Although the invention is illustrated and described herein as embodied in a rail vehicle and a method of producing the rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
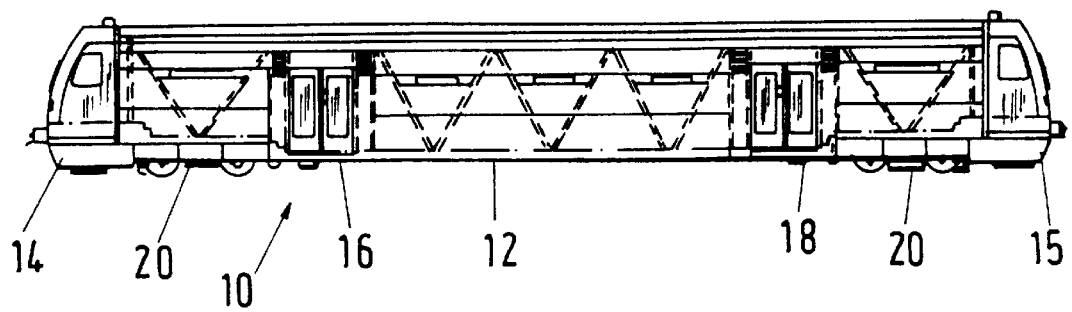
FIG. 1 is a diagrammatic, side-elevational view of an integral rail vehicle according to the invention.

Referring now to the figures of the drawings in detail and first, particularly, to FIG. 1 thereof, there is seen a rail vehicle 10 which is laid out in a low floor construction, with a low floor region 12 thereof being disposed centrally and being surrounded at each end by rail vehicle frame ends 14, 15. The low floor region includes about ⅔ of the entire useful area of the rail vehicle 10 and is provided on each longitudinal side with two access regions 16, 18. Whereas the rail vehicle frame ends 14, 15 have a raised floor region due to running gear 20 and their drives accommodated there, as can be seen in particular from FIG. 2, the low floor region 12 is constructed to be near to the ground to enable passengers to get on and off without difficulty.

Figure 2:
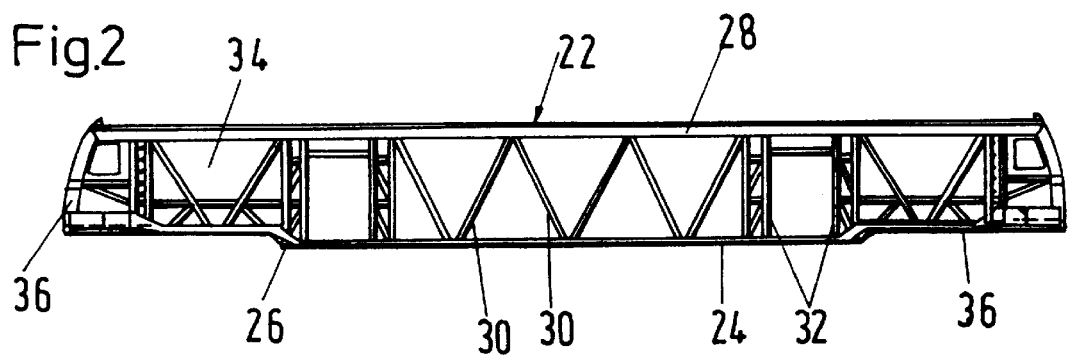
FIG. 2 is a side-elevational view of a superstructure or body according to the invention in the raw state, as it is used in the rail vehicle according to FIG. 1.

A superstructure or body 22 which is illustrated in a side view in FIG. 2 is approximately of trough-like construction, namely with a floor 24 of the superstructure or body which is surrounded on both sides by longitudinal members 26. Side walls 34 of the trough-like superstructure or body 22 are formed by the longitudinal members 26 in each case together with an upper longitudinal flange or chord 28 and side-wall posts 30 and door posts 32 disposed between them.

The side-wall posts 30 are disposed at an inclination relative to one another and, in this case, enclose an angle of about 60° between them in each case. Ends of the side-wall posts are disposed adjacently or in an overlapping manner in each case and are rigidly connected to the lower longitudinal member 26 and the upper longitudinal flange or chord 28. Further reinforcements, in particular vertical or horizontal reinforcements, are not provided for the transmission of force and are not required. The side-wall posts 30 are indicated in FIG. 1 through the use of dashed lines, but these lines are solid in the region of the windows.

It is only in the access regions 18 that vertically disposed door posts are provided, which thus ensure unimpeded access into the rail vehicle 10. In order to be able to absorb and withstand the forces transmitted from the side-wall posts 30, the door posts 32 are formed in the illustrated embodiment by double profiles which are disposed parallel to one another and are strengthened through the use of diagonal struts for reasons of reinforcement. An alternative structure of the configuration of the side-wall posts 30 provided in the frame ends 36 of the superstructure or body 22 is based on the loads which overlap in the transition region from the low floor region 24 to the frame ends 36.

Interior paneling is formed in each case by a covering which is placed from the inside against the framework and is preferably held thereon in a form-locking manner, e.g. through the use of appropriate profiles into which the covering panels are introduced by the upper or lower edge. A form-locking connection is one which connects two elements together due to the shape of the elements themselves, as opposed to a force-locking connection, which locks the elements together by force external to the elements. Instead or in addition, a bonded connection may also be provided between the framework members and the coverings.

Figure 3:
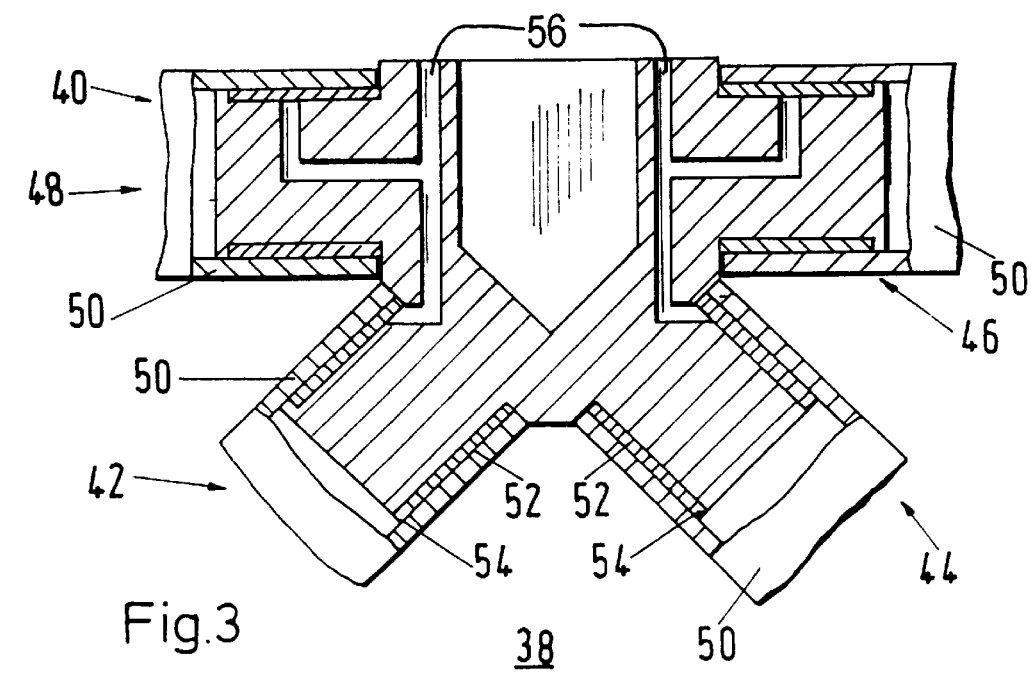
FIG. 3 is an enlarged, fragmentary, sectional view of a junction formed by a shaped piece and bar parts according to the invention.

FIG. 3 illustrates a junction 38 which is formed by a shaped piece 40 having four nozzle-like moldings 42, 44, 46, 48 formed thereon with bar parts 50 formed from hollow profiles of circular cross-section fitted onto the moldings 42, 44, 46, 48. In this case, the bar parts 50 may be used both as side-wall posts 30 and as longitudinal members 26.

The junction 38 is preferably embodied as a shaped piece and is preferably produced as a casting from a light metal alloy and has undercuts or joining regions 52 on each of its moldings 42, 44, 46, 48. The undercuts are bounded towards the free end in each case by a peripheral edge 54. This edge 54 serves on one hand as a guide for the associated, fitted-on bar part 50, and on the other hand as a boundary for the bonding agent which is added through so-called application ducts 56.

We claim:

1. A method of producing a rail-bound rail vehicle for passenger transport, which comprises:

assembling at least one trough-like superstructure with a floor and with adjoining side walls formed in a framework construction from side-wall posts, lower longitudinal members and upper longitudinal flanges;

supporting the upper longitudinal flanges against one another with connecting members;

placing windows and access regions with doors in the side walls;

placing the side-wall posts in a zigzag manner and rigidly connecting the side-wall posts to the lower longitudinal members and the upper longitudinal flanges to serve as supporting elements for the windows and side paneling elements fastened thereto;

assembling the superstructure from shaped pieces and cut-to-length bar parts such that the bar parts and the shaped pieces form node-like junctions, by aligning the bar parts fitted together with the shaped pieces, applying a bonding agent to connecting surfaces between longitudinal ends of the bar parts and the shaped pieces and subsequently bonding the longitudinal ends of the bar parts and the shaped pieces to be connected by setting the bonding agent, and then attaching the side paneling elements and windows by a thick-film bonding technique;

providing the shaped pieces with application ducts formed therein and with nozzle-like moldings formed thereon and providing the nozzle-like moldings with respective undercuts bounded by respective peripheral edges toward respective free ends of the nozzle-like moldings, each of the application ducts discharging into a respective one of the undercuts; and feeding the bonding agent through the application ducts to the connecting surfaces between the longitudinal ends of the bar parts and the shaped pieces.

* * * * *